April 19, 1949.  G. J. WOREL  2,467,416
DEVICE FOR POSITIONING THE BEARING RETAINING
RING IN DRIVE SHAFT ASSEMBLIES
Filed Sept. 19, 1945
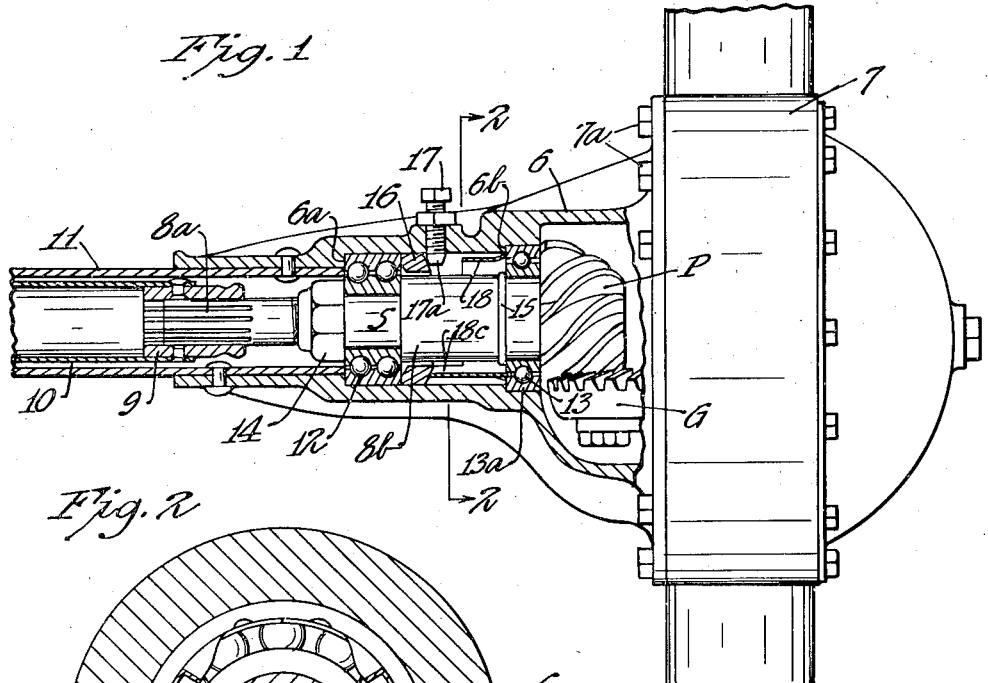
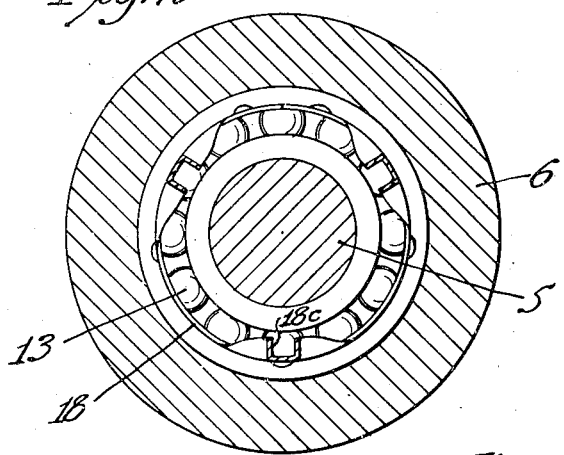
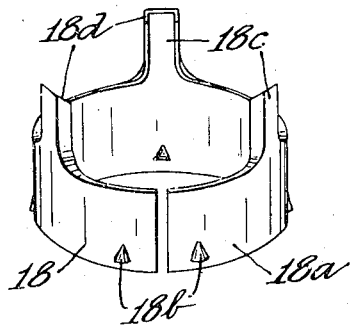
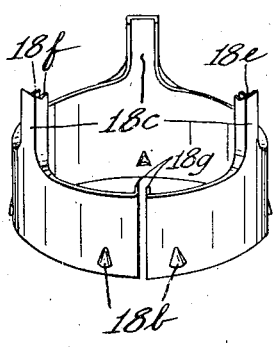
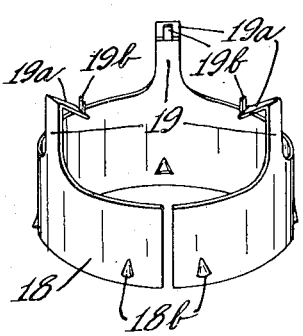
Inventor
Glen J. Worel
By Williamson & Williamson
Attorneys Patented Apr. 19, 1949

2,467,416

UNITED STATES PATENT OFFICE 2,467,416

DEVICE FOR POSITIONING THE BEARING RETAINING RING IN DRIVE SHAFT ASSEMBLIES

Glen J. Worel, Minneapolis, Minn., assignor to Thexton Manufacturing Company, Minneapolis, Minn., a corporation of Minnesota Application September 19, 1945, Serial No. 617,330

4 Claims. (Cl. 308—189)

This invention relates to the assembly and installation of a shaft and bearing unit within a tubular housing and particularly, to a positioning device for properly locating a bearing retaining ring during installation to assure proper location of the bearings in said ring within said housing whereby positive retaining elements may be subsequently applied to lock said retaining ring in place.

My invention, while having applicability to numerous shaft, bearing and housing assemblies, is particularly adapted for facilitating installation or assembly of the drive shaft and bearing units in the housings of certain types of motor vehicles.

In certain motor vehicle structure, the propeller or drive shaft which carries the pinion or worm for driving the differential mechanism is journaled at its rear end in a pair of spaced ball bearings seated in a flaring, tubular housing which is rigidly connected with the differential housing proper. The inner or forward bearing of such structures is held in its seat by a retaining ring which after asssembly and installation within said housing, is locked in operative position by set screws or other elements which are extended through the housing. In installation, the shaft with the two spaced bearings secured thereon and with the retaining ring interposed between the bearings, is longitudinally protruded into the housing from the rear end thereof. The two bearings are lightly driven into place and the forward bearing is engaged by the retaining ring which after installation, is locked in place by a plurality of radially disposed screws which are threaded through the housing. The retaining ring in the structure described, is inaccessible during the installation and without positioning or holding means, usually becomes so displaced that it is impossible to engage the locking screws with the retaining ring and thus, to properly anchor the forward bearing.

A number of generally unsuccessful positioning devices have been used to correctly dispose the ring in engagement against the forward bearing during assembly, such as wrappings of paper, cloth or the securing of other frangible or destructible material to the rotary shaft. Subsequent revolution of the shaft in continued use, wears such positioning means away, disintegrating the same and leaving fragments in the bearings, housings and differential case which are harmful and adversely affect the lubrication of the unit.

It is an object of my invention to provide very simple but highly efficient positioning means for facilitating assembly and installation of a shaft and multi-bearing unit within a housing to assure the proper seating of the retaining ring referred to and to overcome the objectionable features of such make-shift devices which have been heretofore utilized.

A further object is the provision of a simple positioning collar readily attachable to the unit upon the rear bearing and supported independently of the shaft but surrounding the same and mounted in stationary position to engage the retaining ring during installation of the unit to properly position the ring against the forward bearing and to receive abutment from the radial screws or other positive looking elements utilized in the housing to positively retain the ring in operative position.

More specifically, it is an object to provide an efficient positioning means of the class described in the form of a light, preferably sheet metal collar having a base periphery and abutment elements for engagement and stationary mounting within the outer race of the rear bearing of the assembly or unit and having a plurality of forwardly extending, substantially rigid positioning fingers arranged circumferentially with respect to the driving shaft and of precise length to cooperatively abut against the rear beveled face of the retaining ring to properly position the same when the unit is installed.

These and other objects and advantages of my invention will be more apparent from the following description made in connection with the accompanying drawings, wherein like reference characters refer to the same parts throughout the several views and in which:

Fig. 1 is a view, mostly in horizontal section taken axially of an assembled unit illustrating the use of my positioning collar and also showing the radial set screws applied through the housing to positively lock the retaining ring in place after installation of the unit is effected;

Fig. 2 is a cross section taken on the line 2—2 of Fig. 1 looking in the direction of the arrows;

Fig. 3 is a perspective view of one form of my positioning collar, detached;

Fig. 4 is a similar perspective view of a slightly different form of collar adapted for use with assembly units having a slightly different form of retaining ring than that shown in Fig. 1; and Fig. 5 is a perspective view of a slightly different form of positioning collar, detached.

As shown in the drawings, my positioning collar is applied to a certain type of automotive, rear end drive shaft assembly installed in the heavy, rearwardly flaring housing 6 which after assembly, is secured in the usual manner by heavy bolts 7a to the main portion of the differential casing 7. The drive shaft unit comprises a stub shaft S having a diminished forward end 8a which is splined for driving connection with a fitting 9 fixed to the rear end of the usual tubular propeller shaft 10 which is encased within a tubular housing 11 to the rear end of which the flared housing 6 is rigidly secured. Stub shaft S in the assembly has affixed thereto the inner races of the two spaced ball bearings 12 and 13 respectively, the forward and double bearing 12 as shown, having its inner race anchored between the enlarged rear portion 8b of the stub shaft and a clamping nut 14 threaded upon the diminished forward portion of the shaft. The interior of the flared housing is counter bored at 6a and 6b respectively to receive and snugly fit the outer races of bearings 12 and 13. The stub shaft S rigidly carries at its rear end, a heavy driving pinion P meshed with the gear G of the differential mechanism. The inner race of the rear bearing 13 is locked in position in the assembly between pinion P and a collar or split ring 15 affixed in a groove or made integral with the enlarged portion of shaft S.

With such construction, a loose retaining ring 16 is adapted in installation to be assembled behind the outer race of forward bearing 12 and usually has a depressed or relieved forward face to prevent engagement with the outer, revolving race of the forward bearing and is provided with an outwardly beveled rear face to properly receive and engage with wedge effect, the tapered extremities 17a of set screws 17 (usually three in number) which are threaded through suitable bossed portions of the housing 6 extending radially therethrough for positive locking of retaining ring 16 after the parts of the unit are properly assembled.

It will be observed that with this structure, in installation of the bearing-equipped driving shaft unit the retaining ring 16 is inaccessible and unless properly positioned, relative to bearing 12 during sliding of the unit into the housing, will become displaced and cannot thereafter be properly seated or locked unless the shaft unit is longitudinally removed and reapplied.

To positively assure accurate positioning of the retaining ring 16 for assembly in installation, I provide a stationary positioning collar 18 preferably constructed of thin sheet metal having some degree of resiliency and as shown, being longitudinally split for circumferential installation adjustment. The collar 18 is mounted on the unit before installation of the same in the housing 6 and to this end, as shown, the collar 18 has a base periphery 18a adapted to snugly fit or telescope as shown in Fig. 1, within the inner periphery of the outer race 13a of the rear bearing 13. By splitting the collar 18, it may be slightly contracted to facilitate attachment to the said bearing race. A plurality of circumferentially spaced abutment lugs 18b are formed in the outer periphery of collar 18 spaced forwardly a short distance from the rear edge of the collar. These may be conveniently provided by cutting the stock of the collar along short circumferential lines defining the bases of the lugs and then outwardly pressing small portions of the stock forwardly of the slit portion. Abutment lugs 18b engage against the annular shoulder provided by the forward face of race 13a and precisely position the collar for its function in the assembly or installation of the unit.

Collar 18 has rigidly attached thereto, preferably by integral construction, a plurality of circumferentially spaced, forwardly extending ring-positioning arms 18c, preferably reinforced by ribbing or webbing the sheet metal stock of the collar to form arms of U-shaped cross section. These arms extend longitudinally of and in spaced relation to the medial and large portion 8b of the stub shaft S and terminate in beveled extremities 18d shaped to conform to and engage the beveled rear face of retaining ring 16 at circumferentially spaced points thereon.

Thus, in installation of the bearing-equipped drive shaft unit, the bearings 12 and 13 are pre-assembled upon shaft S and held in the proper spaced relationship and my positioning collar is mounted within and upon the outer race 13a of the rear bearing precisely holding the retaining ring 16 in proper relation against the outer race of the forward bearing 12. The unit may then be installed in the usual manner by longitudinal sliding within the rear of housing 6 and gently tapped in place to completely seat the bearings in the counter-bored portions of the housing 6a and 6b respectively. Thus assembled retaining ring 16 is properly disposed to anchor the outer race of forward bearing 12 and to receive the locking set screws 17 when the same are threadedly applied through the tapped bosses of housing 6.

In operation of the automotive vehicle, the retaining ring 16 and my assembly collar is stationary and the collar has no deleterious effect upon the lubrication or operation of the drive shaft or bearings as is the case where a temporary positioning medium such as paper, wood or other material, is affixed to the medial portion of stub shaft S and thereafter, disintegrated by operation of the shaft.

My collar remains in the assembly in its normal spaced relation to the revolving shaft and receives no wear during operation of the assembly. It further serves to act as a spacer abutment between the rear face of the outer race of the rear bearing and the retaining ring and consequently, rear face of the outer race of the forward bearing 12.

In Fig. 4 a positioning collar indentical in all respects with the exception of the shape of the extremities of the ring positioning arms 18c, is illustrated. Here, the extremities of said arms have beveled edges or portions 18e shaped complementarily to outwardly beveled, annular surfaces of a special retaining ring and in addition, have diverging, angled edges or surfaces 18f adapted to engage an opposite bevel or rib on a special retaining ring. The ends of the collar proper where the split occurs are inturned to form abutment edges 18g to prevent slipping of these edges past one another when the collar is contracted in installation.

In Fig. 5, a third slightly different form of my positioning collar is shown, again identical in all respects with the form first described, with the exception that the retaining ring-engaging extremities and ring positioning arms are of slightly different construction. Here, the arms 19 are not ribbed or reinforced but are bent angularly near their extremities to provide beveled abutment seats 19a for engaging the rear beveled face of the retaining ring 16 and are provided at their extremities with forwardly projecting tips 19b adapted to engage within the inner peripheral edge at the rear face of the retaining ring 16.

From the foregoing description, it will be seen that I have provided a simple but highly efficient positioning means for facilitating the assembly and installation of the bearing-equipped drive shaft units in certain automotive and other constructions and eliminating the objectionable features of disintegratable, make-shift devices heretofore used, which were wrapped about or attached to the drive shaft.

It will of course, be understood that various changes may be made in the form, details, arrangement and proportions of the parts without departing from the scope of my invention.

What is claimed is:

1. A device for positioning the bearing-retaining ring of a multi bearing equipped driving shaft unit, and during assembly of said unit in a housing, comprising an annularly arranged element adapted to surround but not engage the driving shaft, means on said element for non-rotative connection thereof with one of said bearings, a series of forwardly extending ring positioning arms connected with said element and circumferentially spaced relative to said shaft and terminating in abutments for engagement against said retaining ring to position said ring against its associated bearing during installation, and said connection means for said element constituting an annular edge for interfitting with the outer race of one of said bearings and abutment means on said element for engagement with the face of said bearing race.

2. A device for positioning the bearing-retaining ring of a multi bearing equipped driving shaft unit during assembly of said unit in a housing, comprising a thin collar adapted to telescopically engage and be effectively supported upon the outer race of one of said bearings, said collar having no driving shaft connection and having a series of circumferentially arranged, longitudinally extending ring positioning arms spaced from said shaft and terminating in abutments for engagement against the retaining ring for a second bearing to properly position said ring during installation and to retain said ring in position for engagement with positive retaining elements applied through said case after installation, and said positioning arms being integrally formed with said collar, and the material thereof being bent upon longitudinal lines to form reinforcing webs on said arms.

3. A device for positioning the bearing-retaining ring of a multi bearing equipped driving shaft unit during assembly of said unit in a housing, comprising a thin collar adapted to telescopically engage and be effectively supported upon the outer race of one of said bearings, said collar having no driving shaft connection and having a series of circumferentially arranged, longitudinally extending ring positioning arms spaced from said shaft and terminating in abutments for engagement against the retaining ring for a second bearing to properly position said ring during installation and to retain said ring in position for engagement with positive retaining elements applied through said casing after installation, and said positioning arms having annularly inturned ends providing beveled abutment portions for engaging the beveled, opposing face of said retaining ring and terminating in the longitudinally projected tips for engaging the inner periphery of said retaining ring.

4. A device for positioning the bearing-retaining ring of a multi bearing equipped driving shaft unit during assembly of said unit in a housing, comprising a thin collar adapted to telescopically engage and be effectively supported upon the outer race of one of said bearings, said collar having no driving shaft connection and having a series of circumferentially arranged, longitudinally extending ring positioning arms spaced from said shaft and terminating in abutments for engagement against the retaining ring for a second bearing to properly position said ring during installation and to retain said ring in position for engagement with positive retaining elements applied through said casing after installation and said arms terminating in V-shaped abutment edges for engaging a substantially V-shaped edge on the opposing face of said retaining ring.

GLEN J. WOREL.

REFERENCES CITED

The following references are of record in the file of this patent:

UNITED STATES PATENTS

| Number | Name | Date |
| --- | --- | --- |
| 1,887,405 | Fogle | Nov. 8, 1932 |
| 2,393,735 | Beezley | Jan. 29, 1946 |